US012766603B2

United States Patent
(12) United States Patent
Uchiyama et al.

(10) Patent No.: US 12,766,603 B2
(45) Date of Patent: Oct. 20, 2026

(54) MACHINE TOOL SYSTEM

(71) Applicant: STAR MICRONICS CO., LTD., Shizuoka (JP)

(72) Inventors: Takuji Uchiyama, Shizuoka (JP); Katsuhiro Shinomiya, Shizuoka (JP); Kenichi Gomi, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 393 days.

(21) Appl. No.: 18/481,604

(22) Filed: Oct. 5, 2023

(65) Prior Publication Data

US 2024/0123510 A1 Apr. 18, 2024

(30) Foreign Application Priority Data

Oct. 13, 2022 (JP) ................................ 2022-164685

(51) Int. Cl.
*B23B 13/10* (2006.01)
*B23B 3/06* (2006.01)
*B23Q 17/22* (2006.01)

(52) U.S. Cl.
CPC ................ *B23B 13/10* (2013.01); *B23B 3/06* (2013.01); *B23Q 17/2233* (2013.01)

(58) Field of Classification Search
CPC ......... B23B 13/10; B23B 13/021; B23B 7/06; B23B 3/06; B23B 13/02; B23B 13/123; G05B 2219/50386; G05B 19/408; G05B 2219/50383; B23Q 15/013; B23Q 17/0952; B23Q 17/2233; Y02P 90/02
See application file for complete search history.

(56) References Cited

U.S. PATENT DOCUMENTS 3,823,628 A * 7/1974 Fortune ................. B23B 13/025 82/126
4,205,569 A * 6/1980 Horn ...................... B23D 21/00 83/183

(Continued)

FOREIGN PATENT DOCUMENTS

JP 60215214 A * 10/1985 ............ B23B 15/00
JP S60215214 A 10/1985

(Continued)

OTHER PUBLICATIONS

Mazak North America: "LNS Servo Barfeeder /1-5 via MTConnect to a Mazak Hyper Quadrex", Nov. 8, 2011 (Nov. 8, 2011), XP093131495, Retrieved from the Internet: URL: https: //www. youtube. com/watch?v=£603Zi GSbMs [retrieved on Feb. 14, 2024].

(Continued)

*Primary Examiner* — Sara Addisu
(74) *Attorney, Agent, or Firm* — MUNCY, GEISSLER, OLDS & LOWE, P.C.

(57) ABSTRACT

A machine tool system is capable of decreasing the operator's burden in setting the parameters. The machine tool system includes a machining apparatus capable of machining a bar and a bar feeder capable of delivering the bar to the machining apparatus according to the machining of the bar. The bar feeder delivers the bar in accordance with the parameters. The bar feeder updates the parameter according to parameter information transmitted from the machining apparatus.

6 Claims, 11 Drawing Sheets

(56) References Cited

U.S. PATENT DOCUMENTS

| | | | | |
|---|---|---|---|---|
| 5,320,008 | A * | 6/1994 | Cucchi ..................... B23B 13/02 82/126 | |
| 6,665,579 | B2 * | 12/2003 | Sasaki ..................... B23B 13/02 82/127 | |
| 8,322,257 | B2 * | 12/2012 | Schaerer ............... B23B 13/021 82/126 | |
| 12,162,078 | B2 * | 12/2024 | Noguchi ................... B23B 3/30 | |
| 12,405,597 | B2 * | 9/2025 | Kamo ................ G05B 19/4155 | |
| 2015/0241867 | A1 | 8/2015 | Kanemaru et al. | |

FOREIGN PATENT DOCUMENTS

| | | | |
|---|---|---|---|
| JP | 2003225804 | A | 8/2003 |
| JP | 2005313267 | A | 11/2005 |
| JP | 2015-156183 | A | 8/2015 |

OTHER PUBLICATIONS

Notice of Reasons for Refusal mailed Jun. 30, 2026 issued in corresponing Japanese Patent Application No. 2022-164685 with English translation, 13 pages.

* cited by examiner

FIG. 4

```
O1234
G*** A__ W__ S__ X__ Z__ F__ B__ Q__ K__;
G170;
G40 G97 M9;
G99 M3 S500;
M11;
G0 Z9.9 T0;
M200;
M20;
M10;
G171;
T100;
G0 X21.0 Z-0.5 M25;
M27;
```

FIG. 11

Parameter Table for Company "A" Bar Feeder

| ADDRESS | DATA SIZE | ARGUMENT | REPRESENTATION |
|---|---|---|---|
| R2000 | 2 byte | A | Bar Shortage Position |
| R2002 | 2 byte | B | |
| R2004 | 2 byte | · · · | Advancing End Position |
| R2006 | 2 byte | · · · | Retracting End Position |
| R2008 | 2 byte | · · · | |
| R2010 | 2 byte | · · · | Work Length |
| R2012 | 1 byte | · · · | Over Feed |
| R2014 | 1 byte | · · · | Short Feed |
| · · · | · · · | · · · | · · · |
| · · · | · · · | · · · | · · · |

Parameter Table for Company "B" Bar Feeder

| ADDRESS | DATA SIZE | ARGUMENT | REPRESENTATION |
|---|---|---|---|
| R2000 | 4 byte | A | Bar Shortage Position |
| R2002 | 4 byte | B | |
| R2004 | 4 byte | · · · | Advancing End Position |
| R2006 | - | · · · | - |
| R2008 | 4 byte | · · · | |
| R2010 | 4 byte | · · · | Bar Length |
| R2012 | 1 byte | · · · | Over Feed Abnormality |
| R2014 | 1 byte | · · · | Short Feed Abnormality |
| · · · | · · · | · · · | · · · |
| · · · | · · · | · · · | · · · |

MACHINE TOOL SYSTEM

CROSS-REFERENCE TO RELATED APPLICATIONS

This application claims priority of Japanese Patent Application No. 2022-164685 filed on Oct. 13, 2022. The contents of this application are incorporated herein by reference in their entirety.

BACKGROUND OF THE INVENTION

The present invention relates to a machine tool system provided with a spindle capable of gripping a workpiece.

A conventional machine tool system includes a machining apparatus and a bar feeder supplying a long bar to the machining apparatus (Japanese Unexamined Patent Application Publications No. 2005-313267). The machining apparatus is provided with a tool and a rotatable spindle capable of releasably gripping the bar. The spindle, gripping or not gripping the bar, is movable in an axial direction of the bar. There is another machining apparatus of spindle stationary type whose spindle is fixed to the base. The machining apparatus incorporates an NC apparatus. The NC apparatus controls the operation of the spindle and a tool post in accordance with a machining program (NC program) written by an operator or in accordance with an operator's input on a panel of the machining apparatus. Under the control by the NC apparatus, the end of the bar is cut to a desired shape and the finished portion is severed off the bar. In most cases, the bar is continuously gripped by the spindle from the start of machining till completion of cut-off. The spindle makes a grip change of the bar after the finished portion is severed. The spindle releases the bar, moves rearward, and then grips the bar again. A cycle of a machining by the tool and a grip change by the spindle is repeated plural times to produce a plurality of products from a single bar according to the number of cycles. A single cycle requires a plurality of grip changes to produce such a long product as exceeding the movable distance of the spindle.

The bar feeder is arranged side by side with the spindle in the axial direction of the bar, specifically on the rear side of the bar. The bar feeder is provided with a pusher and a pusher driving mechanism for driving the pusher in the axial direction of the bar. The pusher has a finger chuck at the front end thereof. The finger chuck grips the rear end of the bar, thereby coupling the pusher with the bar. The pusher driving mechanism drives the pusher toward the front side of the bar, thereby supplying the bar to the machining apparatus. The pusher urges the bar toward the front side thereof at a certain load during machining. The load is set to a smaller value so as not to cause a slip of the bar from the spindle.

SUMMARY

In a conventional machine tool system provided with a working machine and a bar feeder, an operator necessarily sets a machining parameter separately for the plural apparatuses and possibly forgets or fails the operation. The conventional system has a problem of increasing the burden on the operator and causing a machining failure.

The invention provides a solution to the problem with a machine tool system capable of reducing the burden of setting the parameters.

The machine tool system of the invention includes a working machine capable of machining a bar and a bar feeder capable of delivering the bar to the working machine according to the machining of the bar. The bar feeder delivers the bar in accordance with a set parameter. The bar feeder updates the parameter according to parameter information transmitted from the working machine.

The invention provides the machine tool system capable of setting the bar feeder parameters on the working machine side, thereby decreasing the operator's burden.

In the machine tool system, the working machine includes an operating part for use to operate the working machine. The parameter for the bar feeder is set through the operating part.

The invention provides the machine tool system capable of uniting the operation system in setting the parameters, thereby decreasing the operator's burden.

In the machine tool system, the working machine executes a machining program for the machining of the bar. The parameter for the bar feeder is set through execution of the machining program.

The invention provides the machine tool system capable of eliminating the operator's failure or mistakes by executing the parameter setting program, thereby decreasing the operator's burden.

In the machine tool system, the machining program includes a parameter setting command for instructing the bar feeder to set the parameter The parameter setting command includes the parameter information specified by an argument The invention provides the machine tool system capable of specifying the parameters as the arguments, thereby decreasing the operator's burden.

In the machine tool system, the working machine has a table associating the parameter information with each of a specification of the bar feeder. The working machine provides a common interface regardless of the specification of the bar feeder by referring the table to deal with the parameter.

The invention provides the machine tool system capable of using the common interface, thereby decreasing the operator's burden.

The invention provides a machine tool system capable of reducing the burden of setting the parameters.

BRIEF DESCRIPTION OF THE DRAWINGS

FIG. 4 shows an example of a machining program including a parameter setting command.

FIG. 11 shows a parameter table for each bar feeder model.

DETAILED DESCRIPTION

[Configuration of the Machine Tool System]

Figure 1:
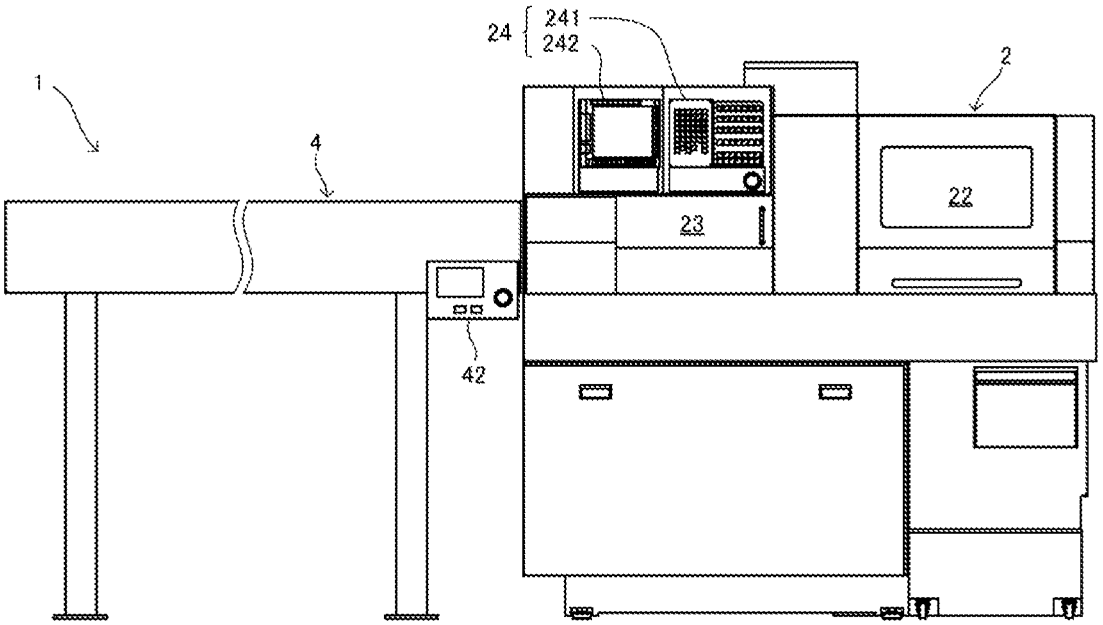
FIG. 1 is a front view of a lathe system of the embodiment.

The embodiment of the invention is being described referring to the drawings. The invention may be applied to a lathe system having an NC lathe and a bar feeder.

FIG. 1 is a front view of the lathe system.

Figure 2:
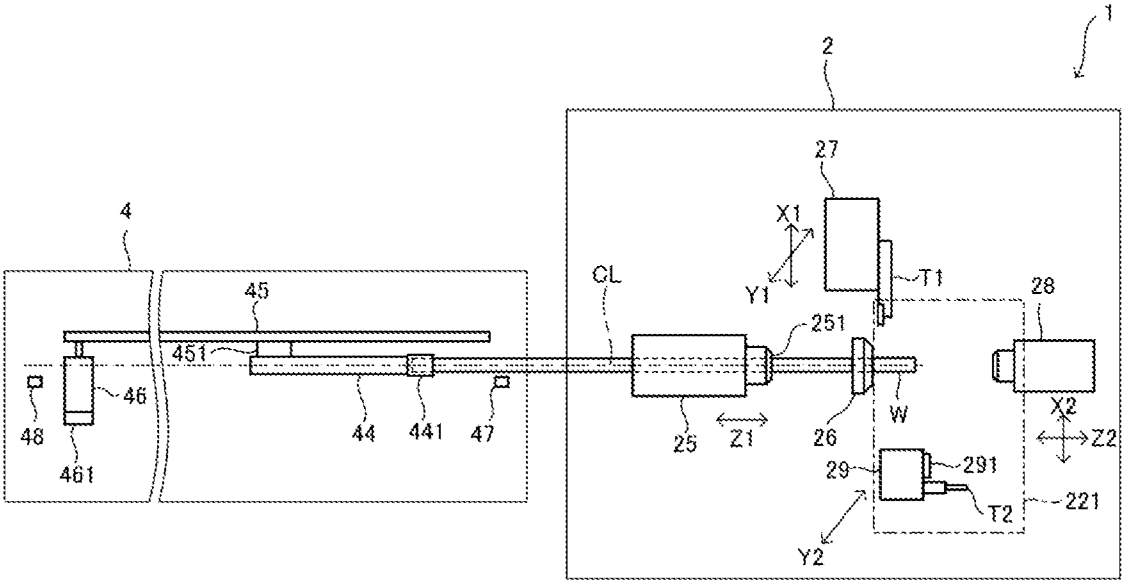
FIG. 2 is a plan view showing an internal configuration of the lathe system shown in FIG. 1.

A lathe system 1 may include an NC (Numerical Control) lathe 2 and a bar feeder 4. The lathe system 1 may correspond to the machine tool system. The NC lathe 2 may be a lathe of Swiss type and correspond to a working machine. The bar feeder 4 may supply a bar W to the working machine. The NC lathe 2 may have a machining chamber 22, a spindle chamber 23, and a lathe operation panel 24. In the machining chamber 22, machining of an end of the bar W (FIG. 2) is performed. The machining chamber 22 may be on the right side as seen from front. The spindle chamber 23 may be a space for a spindle 25 (FIG. 2). The spindle chamber 23 may be on the left side as seen from front.

Figure 3:
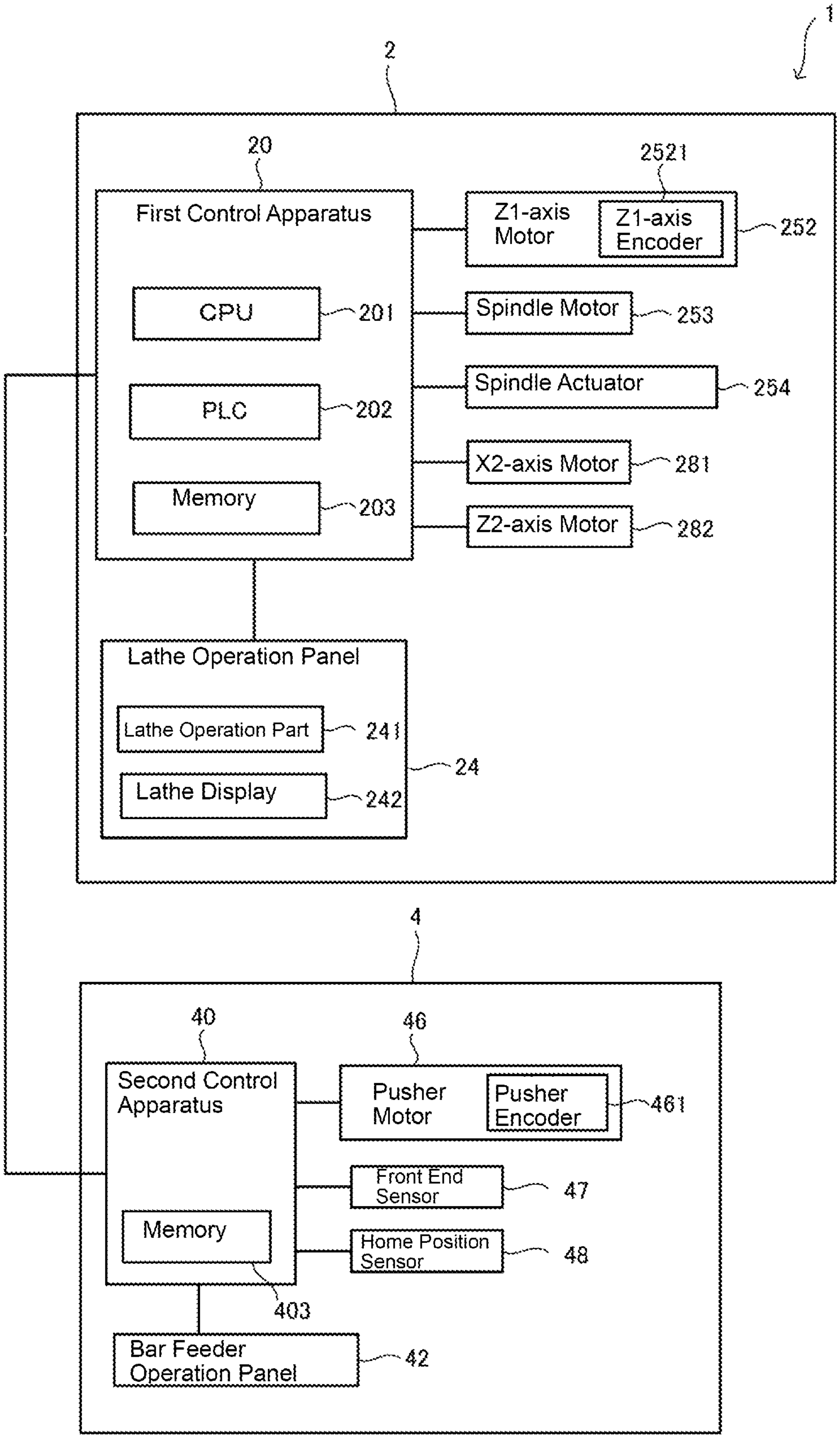
FIG. 3 is a block diagram showing a hardware configuration of the lathe system shown in FIG. 1.

The lathe operation panel 24 may have a lathe operation part 241 and a lathe display 242. The operation part 241 may include a plurality of buttons and keys accepting an input by an operator of the lathe system 1. The operation part 241 may be a touch panel integrated with the display 242. The operator can write a machining program by using the operation part 241 or an external computer and store the program in a memory 203 (FIG. 3). The operator can modify the program by using the operation part 241 and store the program in the memory 203 (FIG. 3). The operator can operate each element of the lathe system 1 independently or cooperatively by using the operation part 241. The display 242 may display the machining program stored in the memory 203 and various information related to the lathe system 1 including parameters and error messages.

The bar feeder 4 may supply the long bar W (FIG. 2) to the NC lathe 2. The bar feeder 4 and the NC lathe 2 may be placed side by side. The bar feeder 4 may store plural bars W. The bar feeder 4 may feed one of the bars W toward the NC lathe 2. The bar feeder 4 may pull a shortened bar out of the NC lathe 2 after completion of machining. The bar feeder 4 may discharge the shortened bar and then feed a brand new bar to the NC lathe 2. The bar feeder 4 may have a bar feeder operation panel 42, which is an input device for the operation of the bar feeder 4.

FIG. 2 is a plan view showing an internal configuration of the lathe system shown in FIG. 1.

The NC lathe 2 may include a spindle 25, a guide bush 26, a first tool post 27, a back spindle 28, and a second tool post 29, which may be all mounted on a base. The spindle 25, the first tool post 27, the back spindle 28, and the second tool post 29 may operate in accordance with the machining program or the operator's input via the panel 24 (FIG. 1).

The spindle 25 may be movable in a Z1-axis direction. The spindle 25 may be mounted on a not-shown slidable headstock. The Z1-axis direction may be a horizontal direction, which corresponds to the right and left directions in FIG. 2. The Z1-axis direction may extend in an axial direction of the bar W. The spindle 25 may be provided with a collet chuck 251 at the front end thereof. The collet chuck 251 may releasably grip the bar W penetrating the spindle 25. The spindle 25 gripping the bar W may be rotatable on a spindle axis CL. The direction of the spindle axis CL may match with the Z1-axis direction. The spindle 25 may move back toward the rear side of the bar W.

The guide bush 26 may be fixed on the base. The end surface of the guide bush 26 may be exposed in the machining chamber 22 (FIG. 1) while the opposite end surface of the guide bush 26 may face the spindle 25. The guide bush 26 may support the front end of the bar W penetrating the spindle 25. The bar W supported by the guide bush 26 may be still slidable in the Z1-axis direction. Part of the guide bush 26 supporting the bar W may be rotatable on the spindle axis CL synchronously with the spindle 25. The front end of the bar W protruding to the machining chamber 22 may be machined by a first tool T1 attached to the first tool post 27. The guide bush 26 may prevent a bend of the long bar W, thereby enhancing machining accuracy of the NC lathe 2.

The first tool post 27 may be movable in an X1-axis direction and a Y1-axis direction. The X1-axis direction may be a horizontal direction perpendicular to the Z1-axis direction. The Y1-axis direction may be a vertical direction. The X1-axis direction may correspond to the up and down directions in FIG. 2 while the Y1-axis direction may be perpendicular to a paper surface. The first tool T1 of a plurality of kinds may be attached to the first tool post 27 in a side by side arrangement in the Y1-axis direction. The first tool T1 may include a cutting tool and a cut-off tool. The first tool T1 may also include a rotary tool such as an endmill and a drill. Moving the first tool post 27 in the Y1-axis direction may allow selection of one of the tools of the plural kinds. Moving the first tool post 27 in the X1-axis direction may allow the tool to cut into the front end of the bar W supported by the guide bush 26 or allow the tool to cut the machined portion off the bar W.

The back spindle 28 may be movable in an X2-axis direction and a Z2-axis direction. The back spindle 28 may be mounted on a not-shown slidable headstock. The X2-axis direction may match with the X1-axis direction while the Z2-axis direction may match with the Z1-axis direction. The Z2-axis direction may correspond to an axial direction of the back spindle 28. In FIG. 2, the spindle 25 and the back spindle 28 face each other on the opposite sides of the guide bush 26. The spindle axis of the back spindle 28 may extend on the same line as the spindle axis CL of the spindle 25. The direction of the back spindle axis may match with the Z2-axis direction. A portion of the bar W held by the spindle 25 may be cut off or severed by the first tool T1 upon completion of machining. The spindle 25 may pass the severed portion of the bar W to the back spindle 28. The severed portion of the bar W may include a portion of the bar W that has been machined and then cut off. The back spindle 28 may releasably grip the severed portion of the bar W. The back spindle 28 may carry the severed portion by moving in the X2-axis and Z2-axis directions.

The second tool post 29 may be movable in a Y2-axis direction. The Y2-axis direction may match with the Y1-axis direction. A second tool T2 may be attached to the second tool post 29. The second tool T2 may include a drill and an endmill. The second tool post 29 may have a plurality of tools arranged in the Y2-axis direction. Moving the second tool post 29 in the Y2-axis direction may allow selection of one of the second tools T2. Moving the back spindle 28 in the X2-axis and Z2-axis directions may allow machining of the cut-off side of the severed portion gripped by the second spindle 28. The severed portion may be discharged as a product upon completion of machining with the back spindle 28. The severed portion may be discharged as a product without machining with the back spindle 28. The second tool post 29 may be provided with a product receiver 291 and a not-shown chute. The chute may be arranged in the second tool post 29. The back spindle 28 may insert the product into the product receiver 291, release the grip, and push the product by a cylinder into the chute. The product dropped in the chute may be carried by a not-shown conveyer to a given place to be discharged to a product stocker externally provided.

A chips receiver 221 may be provided below the machining chamber 22 (FIG. 1) to receive chips and defective products generated during machining with the spindle 25 and the back spindle 28. The portion of the bar W machined with the spindle 25 may be severed with the cut-off tool T1 while the bar W is held by both the spindle 25 and the opposite back spindle 28 synchronously rotated. The severed portion of the bar W may be then delivered to the back spindle 28. When the bar W is not held by the back spindle 28, the severed portion of the bar W may be dropped into the chips receiver 221.

The bar feeder 4 may further include a pusher 44, a pusher driving mechanism 45, a pusher motor 46, a front end sensor 47, and a home position sensor 48 (FIG. 1). The pusher 44 may be movable in the Z1-axis direction on a not-shown guide. A finger chuck 441 may be provided on the front end of the pusher 44 to grip the rear end of the bar W. The finger chuck 441 may be rotatably attached to the other part of the pusher 44, thereby rotatable around the spindle axis CL. The pusher 44 may be coupled to the bar W by the finger chuck 441 gripping the rear end of the bar W. The pusher 44 may move in the Z1-axis direction together with the bar W when the finger chuck 441 grips the bar W.

The pusher driving mechanism 45 may include not-shown pulleys respectively provided on the front end and the rear end of the bar feeder 4 and a driving belt bridging over the pulleys. The driving belt may be provided with a coupling member 451 that may couple the driving belt and the rear end of the pusher 44. The pulley on the rear end of the bar feeder 4 may be connected to an output shaft of the pusher motor 46.

When the output shaft of the pusher motor 46 rotates in one direction, the pusher 44 may move in the Z1-axis direction toward the NC lathe 2 by the pusher driving mechanism 45 and the coupling member 451. When the output shaft of the pusher motor 46 rotates in the other direction, the pusher 44 may move in the Z1-axis direction away from the NC lathe 2 by the pusher driving mechanism 45 and the coupling member 451. Among the bars W stored in the bar feeder 4, the finger chuck 441 may grip the bar W whose axis aligning with the spindle axis CL. When the pusher 44 moves, the bar W gripped by the finger chuck 441 may move in the axial direction of the bar W. When the output shaft of the pusher motor 46 rotates in one direction, the bar W may move toward the front side thereof. When the output shaft of the pusher motor 46 rotates in the other direction, the bar W may move toward the rear side thereof. The pusher motor 46 may be provided with a pusher encoder 461 to detect the number of rotations and the rotation amount of the pusher motor 46. Detection result by the pusher encoder 461 may be transmitted to a second control apparatus 40 (FIG. 3).

The front end sensor 47 may detect the front end of the bar W. The home position sensor 48 may detect whether the pusher 44 is in the home position. The home position of the pusher 44 may be at the rearmost end of the movable range of the pusher 44. The detection results by the front end sensor 47 and the home position sensor 48 may be respectively transmitted to the second control apparatus 40 (FIG. 3). The second control apparatus 40 may recognize the position of the front end of the bar W prior to machining according to the detection results by the front end sensor 47 and the pusher encoder 461. The second control apparatus 40 may recognize the position of the pusher 44 according to the detection results by the home position sensor 48 and the pusher encoder 461.

FIG. 3 is a block diagram showing a hardware configuration of the lathe system shown in FIG. 1. Any element of lower relevancy with the invention are not shown.

The NC lathe 2 may include a first control apparatus 20, the lathe operation panel 24 described above, a Z1-axis motor 252, a spindle motor 253, a spindle actuator 254, an X2-axis motor 281, and a Z2-axis motor 282. The first control apparatus 20 may be a so-called NC (Numerical Control) apparatus including a CPU (Central Processing Unit) 201, a PLC (Programmable Logic Controller) 202, and a memory 203. The first control apparatus 20 may correspond to a controller. The first control apparatus 20 may be a computer having calculation function by the CPU. The first control apparatus 20 may control the operations of the elements including the spindle 25, the first tool post 27, the back spindle 28, and the second tool post 29 in accordance with a program stored in the memory 203 or an operator's input on the operation panel 24. FIG. 3 shows part of the motors and the actuators for the elements. The first control apparatus 20 may mainly execute a numerical-control for the servo motor provided on the NC lathe 2. The PLC 202 of the first control apparatus 20 may mainly execute a sequence-control for the devices other than the servo motor, including cylinders and valves of the NC lathe 2. The memory 203 may include a non-volatile memory and a volatile memory. The non-volatile memory may include a ROM (Read Only Memory), HDD (Hard Disc Drive), and SSD (Solid State Drive). The volatile memory may include a RAM (Random Access Memory).

The Z1-axis motor 252 may be a servo motor rotating upon an instruction from the first control apparatus 20. Rotation of the Z1-axis motor may drive the spindle 25 (FIG. 1) in the Z1-axis direction. A not shown amplifier is provided between the first control apparatus 20 and the Z1-axis motor 252. The Z1-axis motor 252 may be controlled by an instruction given from the first control apparatus 20 through the amplifier. The description of the amplifier is being omitted. The Z1-axis motor 252 may be provided with a Z1-axis encoder 2521 whose output may be transmitted to the first control apparatus 20. The first control apparatus 20 may thereby always recognize the position of the spindle 25 (FIG. 2) with respect to the Z1-axis.

The spindle 25 may be provided with the spindle motor 253 such as a built-in motor. The spindle motor 253 may rotate upon an instruction from the first control apparatus 20. Rotation of the spindle motor 253 may drive the spindle 25 and the bar W gripped by the spindle 25 around the spindle axis CL (FIG. 2). The back spindle 28 may be provided with a back spindle motor, whose description is being omitted. The spindle actuator 254 may include a hydraulic cylinder for the collet chuck 251 (FIG. 2). The spindle actuator 254 may drive a not-shown chuck sleeve forward to close the collet chuck, thereby gripping the bar W by the spindle 25. The spindle actuator 254 may drive the chuck sleeve backward to open the collet chuck, thereby releasing the bar W from the spindle 25.

The X2-axis motor 281 may be a servo motor rotating upon an instruction from the first control apparatus 20. Rotation of the X2-axis motor 281 may drive the back spindle 28 (FIG. 2) in the X2-axis direction. The Z2-axis motor 282 may be a servo motor rotating upon an instruction from the first control apparatus 20. Rotation of the Z2-axis motor 282 may drive the back spindle 28 in the Z2-axis direction. The X2-axis motor 281 and the Z2-axis motor 282 may be provided with not-shown encoders respectively.

The bar feeder 4 may further include the second control apparatus 40.

The second control apparatus 40 may execute a sequence-control for the elements of the bar feeder 40. The second control apparatus 40 may control the operation of not-shown actuators for the pusher motor 46 and the bar feeder 4 in accordance with information received from sensors and the pusher encoder 461. The second control apparatus 40 may also control the operation of the bar feeder 4 in response to an instruction from the first control apparatus 20. The second control apparatus 40 may have a memory 403 for storing information necessary for the control. The memory 403 may include a non-volatile memory and a volatile memory. The non-volatile memory may include a ROM (Read Only Memory), HDD (Hard Disc Drive), and SSD (Solid State Drive). The volatile memory may include a RAM (Random Access Memory).

The pusher motor 46 may be a servo motor rotating upon an instruction from the second control apparatus 40. Rotation of the pusher motor 46 may drive the pusher 44 (FIG. 2) in the Z1-axis direction. As described above, the second control apparatus 40 may recognize the moving distance of the pusher 46 from the home position according to the detection results by the home position sensor 48 and the pusher encoder 461. The second control apparatus 40 may thereby always recognize the position of the pusher 46 with respect to the Z1-axis direction and transmit the recognized data to the first control apparatus 20. The second control apparatus 40 may further transmit position data to the first control apparatus 20 including the Z1-axis position of the front end of the brand new bar W or the Z-axis position of the front end of the bar W supplied first after power-on. The second control apparatus 40 may control the pusher motor 46 to rotate unidirectionally at a certain torque from the beginning of machining to the start of removal of the remaining bar. The bar W may be thereby urged toward the front side thereof by the pusher 44 at a given load. The load may be set to a comparatively small value so as not to cause the bar W to slip out of the spindle 25.

The bar feeder operation panel 42 may be a touch panel integrally having keys and a display. The bar feeder 4 may further have an emergency button and a torque setting switch for the pusher motor 46. Using the panel 42, the operator of the lathe system 1 can manually move the pusher 44 (FIG. 2) in the Z1-axis direction or input various parameters for the bar feeder 4. The panel 42 may display various information of the bar feeder 4 including various parameters and error messages. The panel 42 may further display operation buttons for the bar feeder 4.

The first control apparatus 20 and the second control apparatus 40 may be connected by a signal cable. The first control apparatus 20 may transmit a demand to the second control apparatus 40 through the signal cable. The second control apparatus 40 may transmit various information about the bar feeder 4 to the first control apparatus 20 including position information of the pusher 44. The first control apparatus 20 and the second control apparatus 40 may be wirelessly connected. They may be connected through an internet or may be connected through another device such as a server.

[Bar Feeder Control on the NC Lathe Side]

The bar feeder 4 may be necessarily given various parameters prior to the start of machining. The parameters may relate to a product, material, machining torque, and others. The operator can set such parameters through the bar feeder operation panel 42.

Once the bar feeder 4 has been given such parameters, the NC lathe 2 can perform machining by exchanging minimum information necessary for the machining. For example, information sent from the first control apparatus 20 may include the end of the machining program, a bar feed torque stop command, an open/close command for the collet chuck 251, and abnormality occurrence of the NC lathe 2. Information sent from the second control apparatus 40 may include a bar length shortage (showing the remaining bar does not have enough length for next machining), bar feed completion, empty, ready, and abnormality occurrence of the bar feeder 4.

In the event of any changes in the product or the bar, the operator possibly forgets the setting operation and immediately starts the machining program without updating the parameters.

The embodiment of the invention may provide a parameter setting command (G code, M code) for operating the bar feeder 4 or setting the parameters therefor by using an external device. Upon reading the parameter setting command, the NC lathe 2 (the first control apparatus 20) may transmit a signal to the bar feeder 4 (the second control apparatus 40). The signal may represent a value specified as an argument of the command (a parameter value to be set) and an instruction for rewriting the parameters. The operator can thereby set the parameters for the bar feeder 4 or operate the bar feeder 4 on the NC lathe 2 side without using the bar feeder operation panel 42.

The parameter setting command can be described in the machining program to set the parameters for the bar feeder 4 during execution of the machining program. For example, when the machining program includes a command for sending a signal for setting appropriate parameters for the product in advance, the bar feeder 4 can be given the appropriate parameters every time the machining program is executed. This prevents a problem of forgetting to set the parameters. This eliminates the need of resetting the parameters.

FIG. 4 shows an example of the machining program including the parameter setting command starting with "G***". The operator can set the bar feeder parameters by specifying the arguments for the kind and the value of the parameter in the line. The parameter setting command may be available in any format other than the G code. The M code may be another example.

Figure 5:
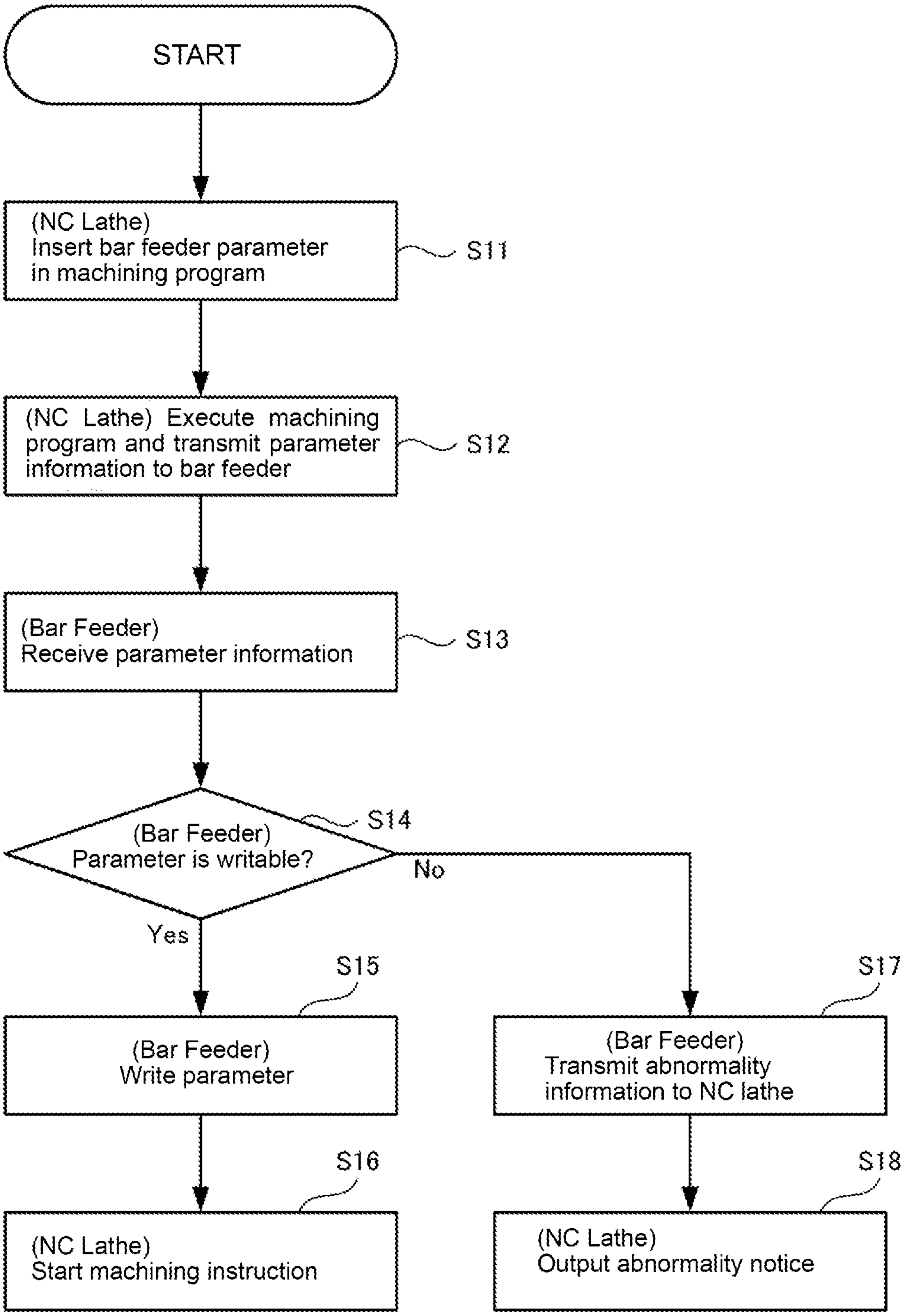
FIG. 5 is a flowchart of execution of the machining program including the parameter setting command.

FIG. 5 is a flowchart of execution of the machining program including the parameter setting command for the bar feeder 4. In Step S11 (a process on the NC lathe 2 side), a bar feeder parameter may be inserted as the argument of the parameter setting command in the machining program. The setting method or timing is not limited. The parameter may be inserted when the machining program is described. The parameter may be input through an interface of the NC lathe 2 prior to execution of the machining program. The parameter may be selected from the list previously input to the NC lathe 2.

In Step S12 (a process on the NC lathe 2 side), the NC lathe 2 may execute the machining program and transmit parameter information specified by the parameter setting command to the bar feeder 4.

In Step S13 (a process on the bar feeder 4 side), the bar feeder 4 may receive the transmitted parameter information. In Step S14 (a process on the bar feeder 4 side), the bar feeder 4 may determine whether the parameter is writable.

In the case that the parameter is writable, the bar feeder 4, in Step S15 (a process on the bar feeder 4 side), may write the parameter according to the received information. Then, in Step S16 (a process on the NC lathe 2 side), the NC lathe 2 may start a machining instruction for each mechanism in accordance with the machining program. In the case that the parameter is not writable, the bar feeder 4, in Step S17 (a process on the bar feeder 4 side), may transmit information of an occurrence of abnormality to the NC lathe 2. Then in Step S18 (a process on the NC lathe 2 side), the NC lathe 2 may output an abnormality notice (warning sound and/or alarm display) according to the received information.

The embodiment can provide a lathe system capable of setting the bar feeder parameters on the NC lathe 2 side as described above referring to FIG. 4 and FIG. 5. An unexperienced operator might set a wrong or inappropriate parameter through the bar feeder operation panel 42, possibly causing a failure or achieving limited function of the system. The program of the embodiment can prevent occurrence of such problem.

The parameter setting command may have a safe default for any unspecified parameter. Furthermore, the embodiment may include another process for introducing a parameter according to the content (machining start position, bar diameter, etc.) of the machining program. The value acquired in such process may be set as the parameter.

There may be various kinds of parameters, different formats of parameters, different number of parameters depending on different models of the bar feeder 4 to perform the same operation or the same function. The embodiment may include another process for preparing and storing different tables of parameters corresponding to the same operation and the function in the memory 203 of the NC lathe 2. The parameter setting command may be executed referring to the particular table according to the model of the bar feeder 4. This eliminates the need of describing the machining program for every model of the bar feeder 4.

[Bar feeder control embodiment (1) by use of the user interface on the NC lathe side] As described above, the first control apparatus 20 may execute the parameter setting command to set the bar feeder parameters on the NC lathe side without using the bar feeder operation panel 42.

The bar feeder control embodiment by use of the user interface on the NC lathe side is being described referring to the drawings. The parameter setting command may be executed according to an input operation through the user interface.

Figure 6:
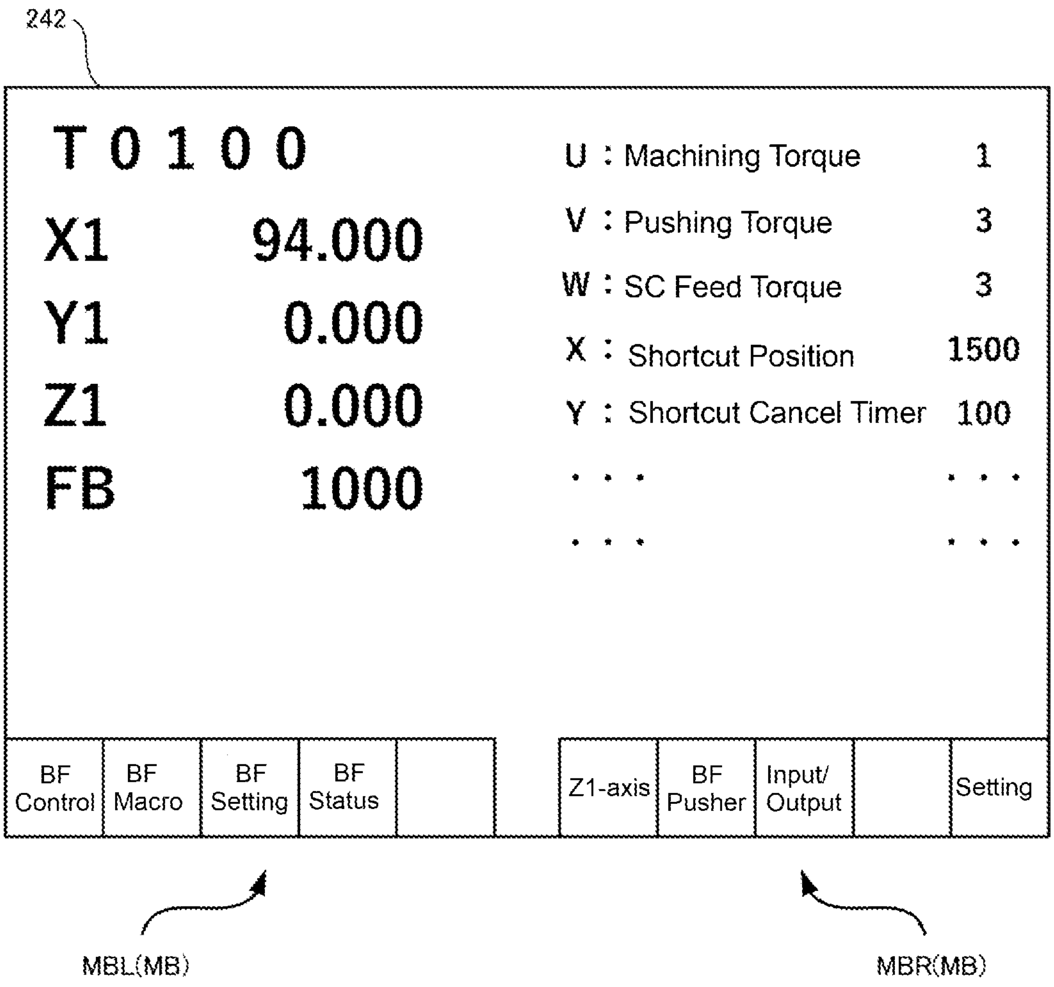
FIG. 6 shows a screen of a lathe display.

FIG. 6 shows a screen of the lathe display 242. The lathe display 242 may have menu buttons MB on the bottom. The menu buttons MB may include left menu buttons MBL and right menu buttons MBR. The menu buttons MB may respectively correspond to the buttons of the operating part 241 arranged below and outside the display 242. Operating the button of the operating part 241 can enable the operation of the corresponding menu button MB. The menu button MB may display various operations according to the situation to facilitate frequently executed operations. An operation by use of the menu buttons MB shown in the screen is being described.

Upon operating the button corresponding to the "Bar Feeder Setting (BF Setting)" among the left menu buttons MBL, as shown on the left column in FIG. 6, the screen shows the tool number and the parameters of the tool such as coordinates, and on the right column, some of bar feeder parameter items. The operator can select one of the bar feeder parameter items, input a desired value, and then operate the button corresponding to "Setting" among the right menu buttons MBR to update the parameter.

Figure 7:
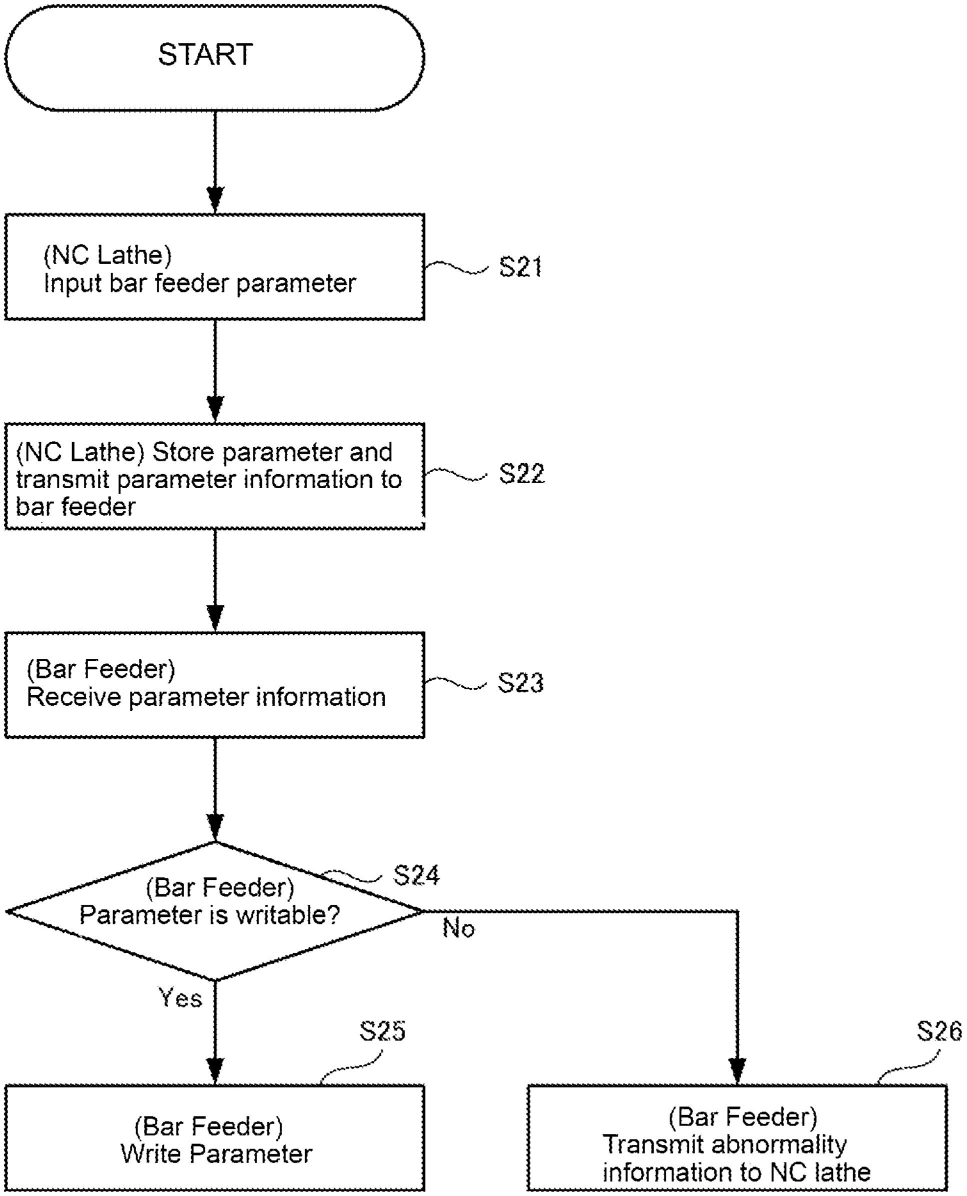
FIG. 7 is a flowchart of execution of the parameter setting command via a user interface.

FIG. 7 is a flowchart of execution of the parameter setting command via the user interface. In Step S21 (a process on the NC lathe 2 side), a bar feeder parameter may be input through the user interface. In Step S22 (a process on the NC lathe 2 side), the NC lathe 2 may temporality store the parameter and then transmit parameter information to the bar feeder 4 by the parameter setting command.

In Step S23 (a process on the bar feeder 4 side), the bar feeder 4 may receive the transmitted parameter information. In Step S24 (a process on the bar feeder 4 side), the bar feeder 4 may determine whether the parameter is writable. In the case that the parameter is writable, the bar feeder 4, in Step S25 (a process on the bar feeder 4 side), may write the parameter according to the received information. In the case that the parameter is not writable, the bar feeder 4, in Step S26 (a process on the bar feeder 4 side), may transmit information of an occurrence of abnormality to the NC lathe 2. The embodiment provides the lathe system capable of setting the bar feeder parameters via the user interface on the NC lathe 2 side.

Furthermore, the operator can output the present parameter into the memory 203 or input the parameter stored in the memory 203 by operating the button corresponding the "Input/Output" among the right menu button MBR after operating the button corresponding the "Bar Feeder Setting (BF Setting)" among the left menu button MBL. Providing and using a database of the bar feeder parameters can facilitate and ensure a process of parameter setting.

Figure 8:
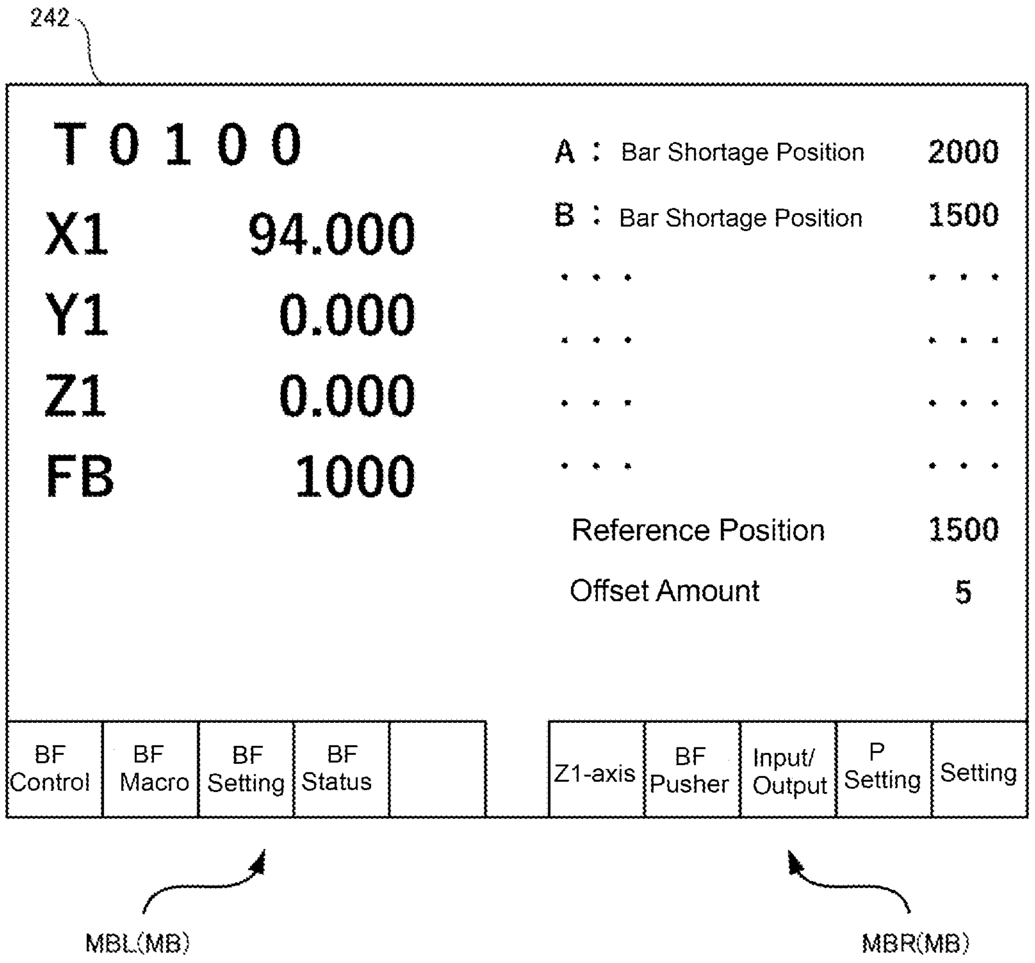
FIG. 8 shows a screen of the lathe display.

[Bar feeder control embodiment (2) by use of the user interface on the NC lathe side] FIG. 8 shows a screen of the lathe display 242 upon operating the button corresponding to the "Pusher Setting (P Setting)" among the right menu buttons MBR. On the left column, the screen shows the tool number and the parameters of the tool, and on the right column, some of pusher parameter items about the pusher 44. The operator can select one of the pusher parameter items, input a desired value, and then operate the button corresponding to the "Setting" among the right menu buttons MBR to update the parameter.

The operator may operate the button corresponding to the "Pusher Setting (P Setting)" among the right menu buttons MBR, select one of the pusher position parameter items, and then operate the button corresponding the "Bar Feeder Pusher (BF Pusher) among the right menu buttons MBR to change the position of the pusher 44. After the pusher 44 moves to the desired position, the operator may operate the button corresponding to the "Pusher Setting (P Setting)" again among the right menu buttons MBR to update the selected parameter according to the present pusher position.

Furthermore, the operator can output the present parameter into the memory 203 or input the parameter stored in the memory 203 by operating the button corresponding the "Input/Output" among the right menu button MBR after operating the button corresponding the "Pusher Setting (P Setting)" among the right menu button MBR. Providing and using a database of the bar feeder parameter items can facilitate and ensure a process of parameter setting.

[Bar Feeder Parameter Setting by Use of Offset Amount]

When a plurality of lathe systems 1 are used to machine the same product, a bar feeder parameter setting program described in one of the lathe systems is desirably applied to the other lathe systems. It is, however, difficult to apply the same program in different lathe systems because of different positional relationship between the NC lathe 2 and the bar feeder 4. The parameter appropriately set in a system might be inappropriate in another system.

In this embodiment, the position of the bar feeder 4 with respect to the NC lathe 2 in one lathe system 1 may be defined as a reference position. Then the position of the bar feeder 4 with respect to the NC lathe 2 in another lathe system 1 may be defined as a difference (offset amount) from the reference position. An appropriate position value for each lathe system 1 may be introduced from the reference position and the offset amount to set the bar feeder position parameters. For example, the argument of the parameter setting command may be decided based on the "Reference Position" and the "Offset Amount." FIG. 8 shows the bar feeder parameter items including the "Reference Position" and the "Offset Amount". The offset amount may be a parameter corresponding to the difference from the reference position.

Setting the "Reference Position" is being described. The operator may operate the button corresponding to the "Bar Feeder Control (BF control)" among the left menu buttons MBL, operate the button corresponding to the "Pusher Setting (P Setting)" among the right menu buttons MBR, select the item "Reference Position" from the bar feeder parameter items, and then operate the button corresponding to the "Bar Feeder Pusher (BF pusher)" among the right menu buttons MBR. After the pusher 44 moves to the desired position, the operator may operate the button corresponding to the "Pusher Setting (P Setting)" again among the right menu buttons MBR to update the value of "Reference Position" according to the present pusher position.

Setting the "Offset Amount" is being described. The value of "Reference Position" has been defined prior to setting the "Offset Amount." The operator may operate the button corresponding to the "Bar Feeder Control (BF control)" among the left menu buttons MBL, operate the button corresponding to the "Pusher Setting (P Setting)" among the right menu buttons MBR, select the item "Offset Amount" from the bar feeder parameter items, and then operate the button corresponding to the "Bar Feeder Pusher (BF pusher)" among the right menu buttons MBR. After the pusher 44 moves to the desired position, the operator may operate the button corresponding to the "Pusher Setting (P Setting)" again among the right menu buttons MBR to update the value of "Offset Amount" according to the present pusher position.

Figure 9:
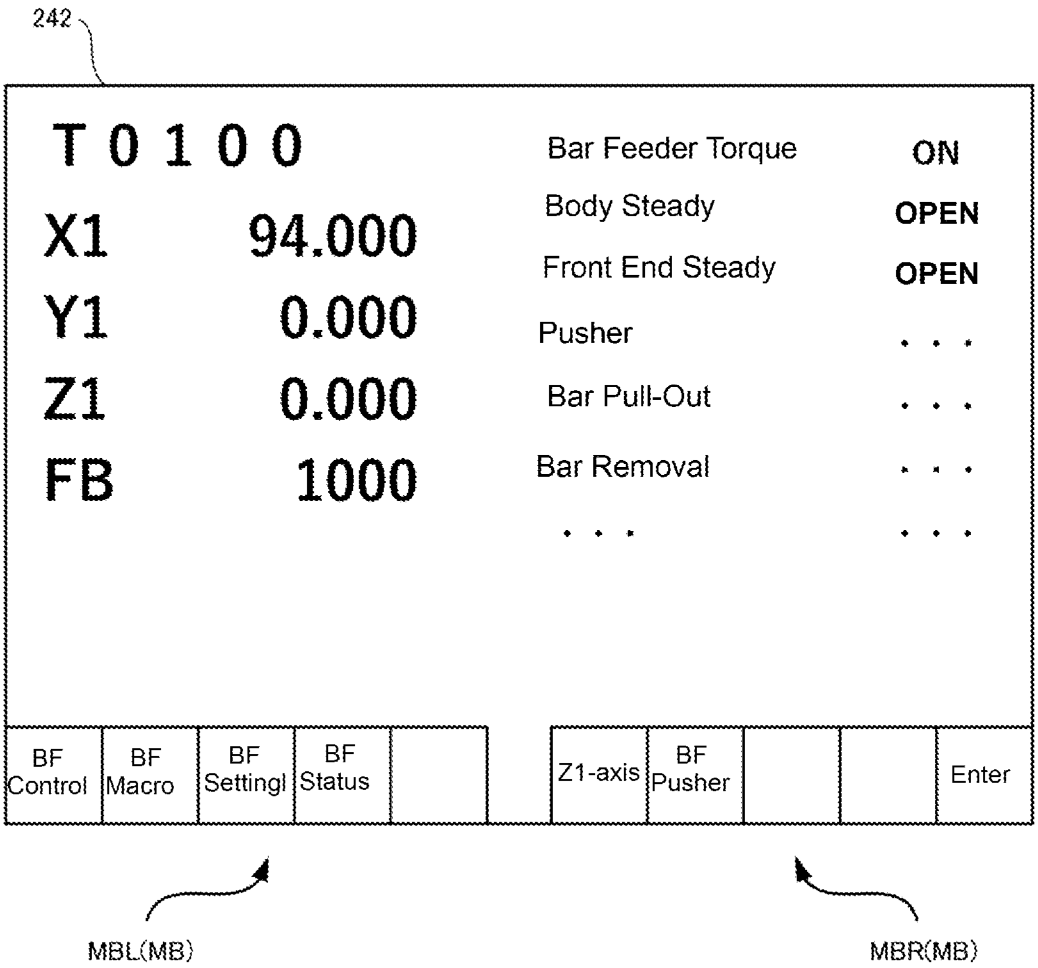
FIG. 9 shows a screen of the lathe display.

[Bar feeder control embodiment (3) by use of the user interface on the NC lathe side] FIG. 9 shows a screen of the lathe display 242 upon operating the button corresponding to the "Bar Feeder Control (BF Control)" among the left menu buttons MBL. On the left column, the screen shows the tool number and the tool parameters, and on the right column, some of status items of the pusher 44. The operator can operate the button corresponding to the "Z1-axis" among the right menu buttons MBR to designate the spindle 25 as the target of operation. The operator can operate the button corresponding to the "Bar Feeder Pusher (BF Pusher)" among the right menu buttons MBR to designate the pusher 44 as the target of operation. The target of operation may be movable by operating the lathe operating part 241 (such as a handle and a jog key). The operator can select one of the status items and change the status to manually operate the status of the selected status item. Manual operation of the bar feeder 4 on the NC lathe 2 side is available by combination of the status items.

Figure 10:
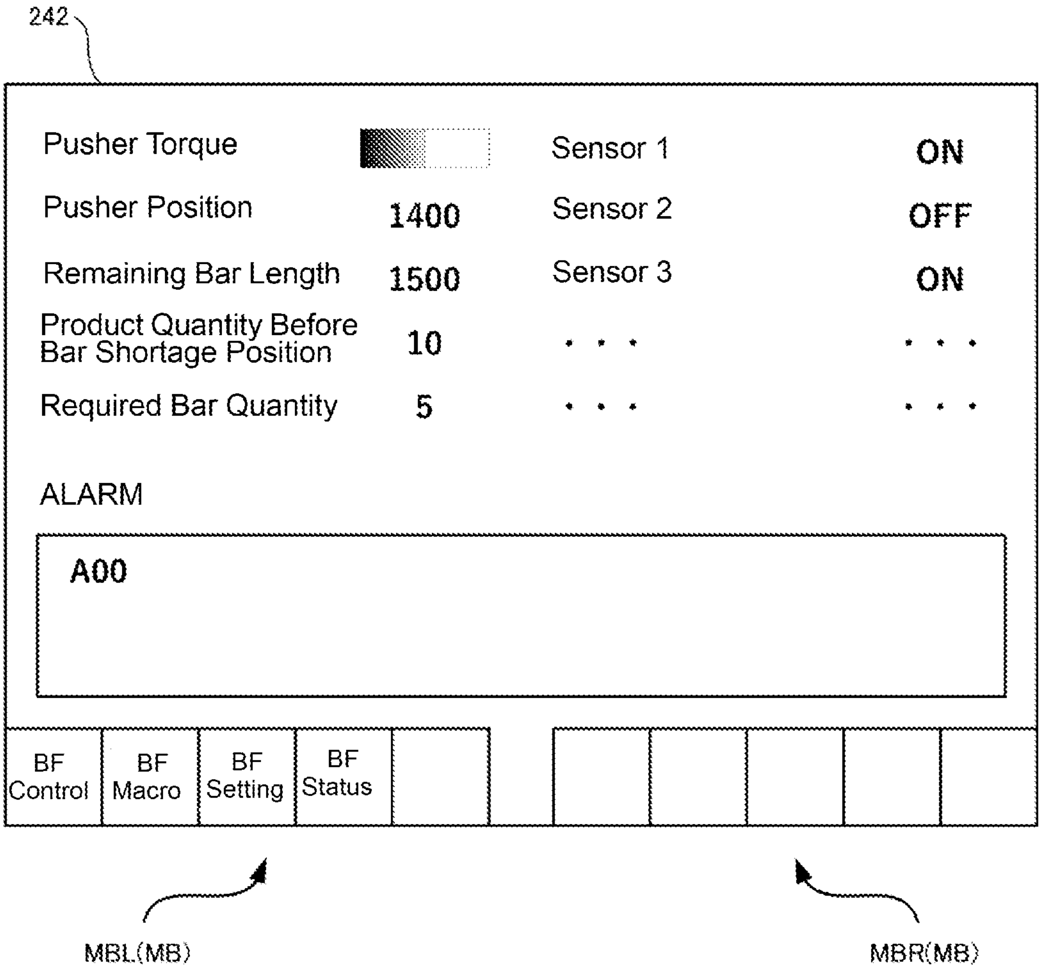
FIG. 10 shows a screen of the lathe display.

[Bar feeder control embodiment (4) by use of the user interface on the NC lathe side] FIG. 10 shows a screen of the lathe display 242 upon operating the button corresponding to the "Bar Feeder Status (BF Status)" among the left menu buttons MBL. On the left column, the screen shows the bar feeder parameter items and information thereof, and on the right column, some of signal status of sensors of the bar feeder 4. An alarm screen is provided immediately above the menu buttons MB to show the alarm number and the alarm contents that has occurred.

The value of the items "Pusher Torque" and "Pusher Position" among the bar feeder parameter items may be based on information transmitted from the bar feeder 4. The value of the items "Remaining Bar Length," "Number of Products Before Bar Length Shortage," and the "Number of Bars Required" may be calculated from the transmitted information and other information that has been separately input. The "Remaining Bar Length" may be calculated from the pusher present position and the bar shortage position. The "Number of Products Before Bar Length Shortage" may be calculated by dividing the "Remaining Bar Length" by a length required for a single product. The "Number of Bars Required" may be calculated by dividing the remaining planned quantity of manufacture by the producible number per bar. The remaining planned quantity of manufacture may be obtained by subtracting the quantity of manufacture from the planned quantity of manufacture. The producible number per bar may be obtained by dividing the length from the pusher initial position to the bar length shortage position by the length required for a single product. The values may be calculated either on the NC lathe 2 side or on the bar feeder 4 side.

[Common Interface Applicable to Different Bar Feeders]

Specifications of the bar feeder such as the number and location of the sensors vary depending on the bar feeder models. Bar feeder information vary depending on the bar feeder models. Separately providing the interfaces as described referring to FIG. 6 to FIG. 10 for the different bar feeder models would increase an operator's burden according to the number of the bar feeder models.

The different bar feeder models, however, have some common basic specifications and use some common information. A common interface for such common information including the basic parameters may be provided for display and control. Corresponding information of the bar feeder may be assigned to the display and the control through the common interface by referring to the table provided for each bar feeder model.

FIG. 11 shows a parameter table for each bar feeder model. The table may include an address of the memory 403 storing a bar feeder parameter available on the common interface and related information for the parameter. For the parameter assigned to the address R2000, in Company A bar feeder, the data size is 2 bytes, the argument of the parameter setting command is "A", and the representation is the "Bar Shortage Position". In Company B bar feeder, the data size is 4 bytes, the argument of the parameter setting command is "A", and the representation is the "Bar Shortage Position". For the parameter assigned to the address R2010, in Company A bar feeder, the data size is 2 bytes and the representation is the "Workpiece Length". In Company B bar feeder, the data size is 4 bytes and the representation is the "Bar Length".

Using such tables facilitates an appropriate use of the parameters according to the specifications of the bar feeder 4. A common interface is available for different bar feeder models. A table for a specific model may be additionally provided as required, thus decreasing the operator's burden.

The embodiment described above is only an example of the invention. The invention may not be limited to the embodiments. For example, the embodiment may be applied in a lathe of stationary spindle type.

What is claimed is:

1. A machine tool system comprising:

a machining apparatus configured to machine a bar;

a bar feeder configured to capable of delivering the bar to the machining apparatus according to different machining stages of the bar;

a first control apparatus provided on the machining apparatus and configured to controll the machining apparatus; and a second control apparatus provided on the bar feeder and configured to controll the bar feeder;

wherein the bar feeder delivers the bar in accordance with parameters, which have been set in the second control apparatus, for the bar feeder to deliver the bar to the machining apparatus, and the second control apparatus of the bar feeder is configured to the parameters according to parameter information, which contains information for updating the parameters, transmitted from the first control apparatus of the machining apparatus, and the first control apparatus of the machining apparatus comprises a table associating the parameter information with each of different models of the bar feeder and provides a common interface, through which the parameters for the bar feeder is displayed and controlled, regardless of the model of the bar feeder by referring to the table to deal with the parameters, and the table is stored in a memory disposed in the first control apparatus.

2. The machine tool system of claim 1, wherein the machining apparatus comprises an operating part for use to operate the machining apparatus, and the parameters for the bar feeder is set through the operating part.

3. The machine tool system of claim 1, wherein the machining apparatus executes a machining program for the machining of the bar, and the parameters for the bar feeder is set through execution of the machining program.

4. The machine tool system of claim 2, wherein the machining apparatus executes a machining program for the machining of the bar, and the parameters for the bar feeder is set through execution of the machining program.

5. The machine tool system of claim 3, wherein the machining program comprises a parameter setting command for instructing the bar feeder to set the parameters, and the parameter setting command comprises the parameter information specified by an argument.

6. The machine tool system of claim 4, wherein the machining program comprises a parameter setting command for instructing the bar feeder to set the parameters, and the parameter setting command comprises the parameter information specified by an argument.

* * * * *